United States Patent [19]

Stevens et al.

[11] Patent Number: 4,469,418
[45] Date of Patent: Sep. 4, 1984

[54] SURVEYING METHOD AND APPARATUS

[75] Inventors: David Stevens; Hugh Anderson, both of Wiltshire, England

[73] Assignee: B.K.S. Surveys Limited, Wiltshire, England

[21] Appl. No.: 435,347

[22] Filed: Oct. 20, 1982

[30] Foreign Application Priority Data

Oct. 27, 1981 [GB] United Kingdom ............... 8132383

[51] Int. Cl.³ .................... G01B 11/24; G01D 9/42
[52] U.S. Cl. ........................... 354/63; 33/DIG. 1 H;
354/77; 356/248; 356/376
[58] Field of Search ............... 354/63, 81, 77;
346/107 W; 356/138, 248, 250, 247, 21, 376;
33/1 H, 302, 290, 299

[56] References Cited

U.S. PATENT DOCUMENTS

| 3,168,023 | 2/1965 | Harmon | 354/63 |
| 3,242,340 | 3/1966 | Layne | 356/138 X |
| 3,776,641 | 12/1973 | Northcutt et al. | 356/397 |
| 3,820,903 | 6/1974 | Kindl et al. | 356/138 |
| 3,982,839 | 9/1976 | Schwartz | 356/250 |
| 4,031,629 | 6/1977 | Paluck | 33/299 X |
| 4,052,712 | 10/1977 | Ohama et al. | 354/81 X |
| 4,063,283 | 12/1977 | Rider et al. | 354/63 X |
| 4,367,021 | 1/1983 | Nordgren et al. | 33/1 H X |
| 4,396,942 | 8/1983 | Gates | 356/397 X |

FOREIGN PATENT DOCUMENTS

| 614773 | 12/1979 | Switzerland . |
| 736966 | 9/1955 | United Kingdom ............... 33/1 H |
| 2072974 | 10/1981 | United Kingdom . |

Primary Examiner—Daniel M. Yasich
Attorney, Agent, or Firm—Watson, Cole, Grindle & Watson

[57] ABSTRACT

A device for producing a plane of light includes a ring flash and/or halogen lamps mounted in a casing defining an inner peripheral aperture slot and an outer peripheral aperture slot coplanar with the inner slot. The device is used in surveying structures and in particular for optically producing photographically recorded tunnel sections. The light plane emitted from the device has high intensity and resolution and serves to illuminate a line profile of the tunnel in the light plane. The photographic image obtained has good contrast and quality and permits on-line numerical analysis to detect deformations.

12 Claims, 9 Drawing Figures

SURVEYING METHOD AND APPARATUS

BACKGROUND OF THE INVENTION

1. Field of Invention

This invention relates to a method of and apparatus for use in carrying out structural surveys. The invention is of particular advantage in photographic tunnel sectioning, but it is applicable also to the surveying of other structures such as pipelines, e.g. sewer pipes, bridges and ventilation shafts. In the interests of brevity and clarity the invention will be described herein in relation to the photographic sectioning of railway tunnels. It should be understood, however, that this application of this invention is given by way of non-limiting example only.

Description of the Prior Art

In the past, tunnel sectioning has been carried out using stereo-photogrammetric techniques. Although the results are satisfactory this method has the disadvantages of being expensive and time consuming.

It has been proposed to optically produce photographic records of tunnel profiles by projecting a plane onto the tunnel walls and photographing the illuminated line contour. The image obtained is a graphical representation of the tunnel section at that plane. Although this method has been tested it has met with limited success and it has not been taken into general use. The light plane was generated by sandwiching a photographic ring flash between a pair of reflective plates. The plane of light emitted by this device is very coarse so that the line quality and contrast are poor and the lack of resolution in the photographic image makes accurate assessment of deformations in the tunnel contour impossible.

The present invention seeks to overcome the drawbacks of the methods described above and according to the invention there is provided a structural surveying method wherein a plane of light is emitted by a device and impinges on the structure being surveyed to produce an illuminated line profile of the structure in the light plane. The light emitting device includes a housing defining a chamber having a peripheral wall with a first circumferentially extending light transmitting aperture, a second circumferentially extending light transmitting aperture spaced outwardly from and coplanar with the first aperture, and a light source for emitting light into the chamber. A substantially planar beam of light is thereby transmitted outwardly through the apertures when the light source is illuminated.

The illuminated line profile is preferably recorded photographically and the photographic image may be analyzed numerically. The numerical analysis may include the steps of scanning the profile image, digitizing the coordinates of selected points on the line image, applying scale corrections to the digitized coordinates, and computing parameters representative of the structural geometry.

In accordance with another aspect, the invention provides an apparatus for use in carrying out structural surveys, including a device for emitting a plane of light to produce an illuminated line profile of a structure being surveyed. The device includes a housing enclosing a chamber having a peripheral wall, a first circumferentially extending light transmitting aperture in the peripheral wall, a second circumferentially extending light transmitting aperture spaced outwardly from and coplanar with the first aperture, and a light source arranged to illuminate the interior of the chamber for light emitted therefrom to be transmitted through the apertures and project therefrom as a substantially planar beam.

The double aperture arrangement has been found to produce a plane of light of adequate intensity for surveying railway tunnels and at the same time with sufficient resolution to permit photographic recordal of the tunnel sections and on-line numerical analysis of the photographic images. If required three or more coplanar apertures could be used.

In a preferred device according to the invention the housing has a non-reflective interior surface; the apertures extend substantially entirely around the chamber; the light source is a photographic ring flash and/or halogen lamp mounted within the chamber; and, each aperture is defined between a pair of opposed lips parallel to the plane of the apertures.

Various other objects, features and attendant advantages of the present invention will be more fully appreciated as the same becomes better understood from the following detailed description when considered in connection with the accompanying drawings, in which like reference characters designate like or corresponding parts through the several views and wherein.

Figure 1:
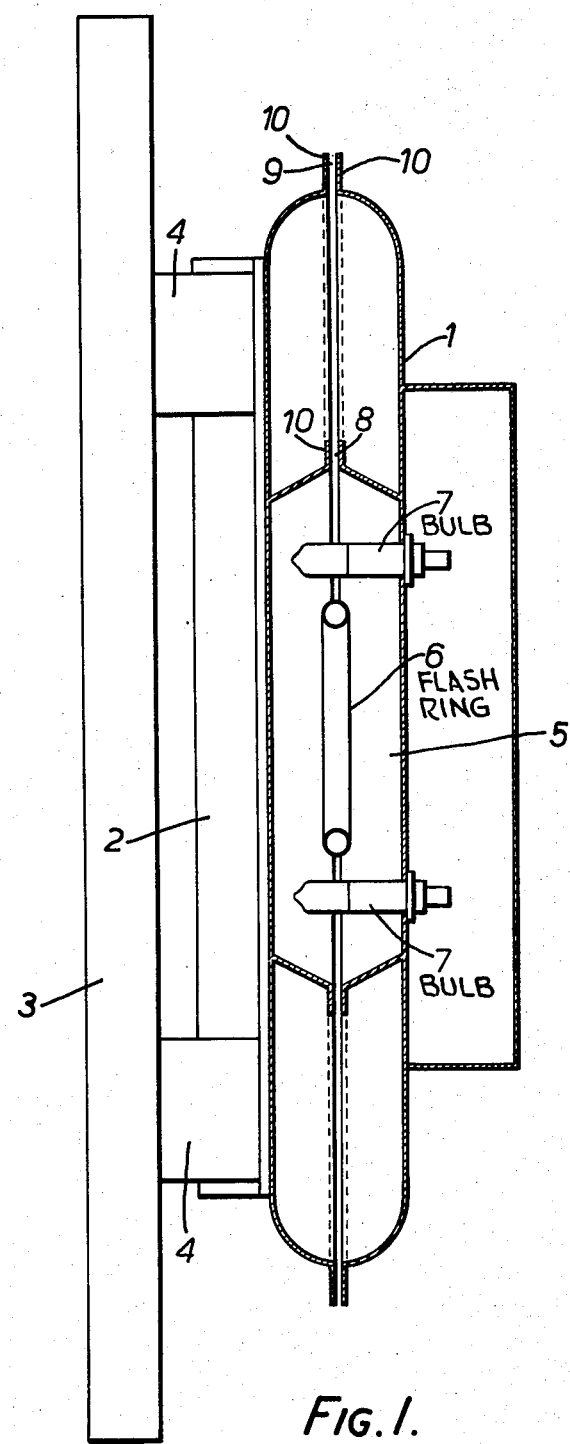
FIG. 1 is a schematic cross-section through a preferred device for emitting a plane of light according to the invention.

Referring initially to FIG. 1, there is shown a device for producing a light plane. The device includes a casing 1 supported by a chassis 2 which in turn is carried by a mounting frame 3 through insulating shock absorber blocks 4. Within the casing 1 is defined a chamber 5 housing light sources in the form of a photographic ring flash 6 and halogen bulbs 7. The chamber 5 has a peripheral wall provided by opposed flanges which define an aperture slot or slit 8. At its periphery the casing 1 defines a second aperture slot or slit 9 which is coplanar with the inner slit 8. Each slit aperture 8, 9 is defined between a pair of parallel opposed lips 10, which is found to reduce lateral diffraction of light transmitted radially through the slits. When either of the light sources is energized a plane of light is emitted through the aperture slits 8, 9 and due to the double slit arrangement, with the slits being spaced apart by a distance many times greater than their widths, the light beam has only a relatively small divergence from the plane of the slits. The inside of the casing has a non-reflective surface, e.g. matt black, so that only light passing directly through the slits from the light source is emitted.

Figure 2:
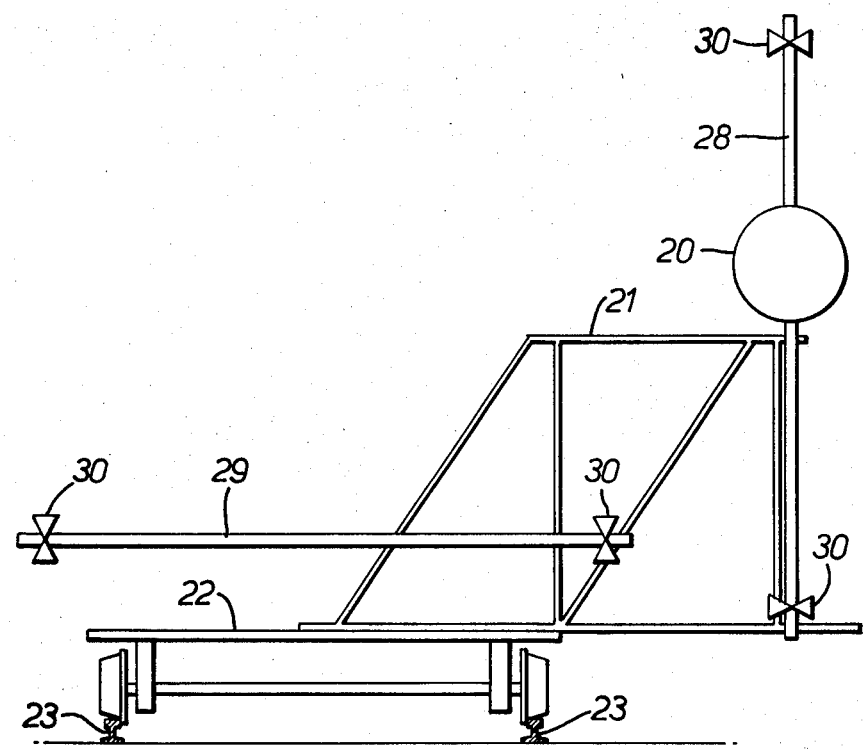
FIG. 2 shows the device of FIG. 1 mounted on a railway trolley to facilitate movement into and along a railway tunnel.
Figure 2A:
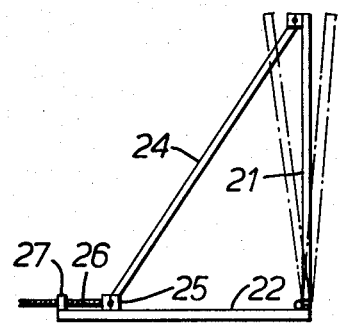
FIG. 2a is a side view showing a detail of the trolley mounting.

FIG. 2 shows the light plane emitter 20 mounted on a support frame 21 which is in turn mounted on a trolley 22 which runs on rails 23 to facilitate movement into and along a railway tunnel. As illustrated in FIG. 2a, the frame 21 is hinged to the trolley 22 and a strut 24 is pivoted to the top of the frame and a block 25 which is connected to a lead screw 26 threadedly engaged in a block 27 fixed to the trolley. It will be appreciated that rotation of screw 26 adjusts the inclination of the frame 21 to facilitate adjustment into the vertical position.

Also carried by the frame 21 are vertical and horizontal scale bars 28, 29, respectively. These bars have spaced scale points 30 which become illuminated by the plane of light emitted by the generator 20. Since the points 30 are separated by known distances on each bar 28, 29, the scale bars will enable the true scale of a photographic image to be determined. The vertical scale bar is attached directly to the light plane generator or emitter and carries a spirit bubble to enable it to be positioned truly vertical.

Figure 3:
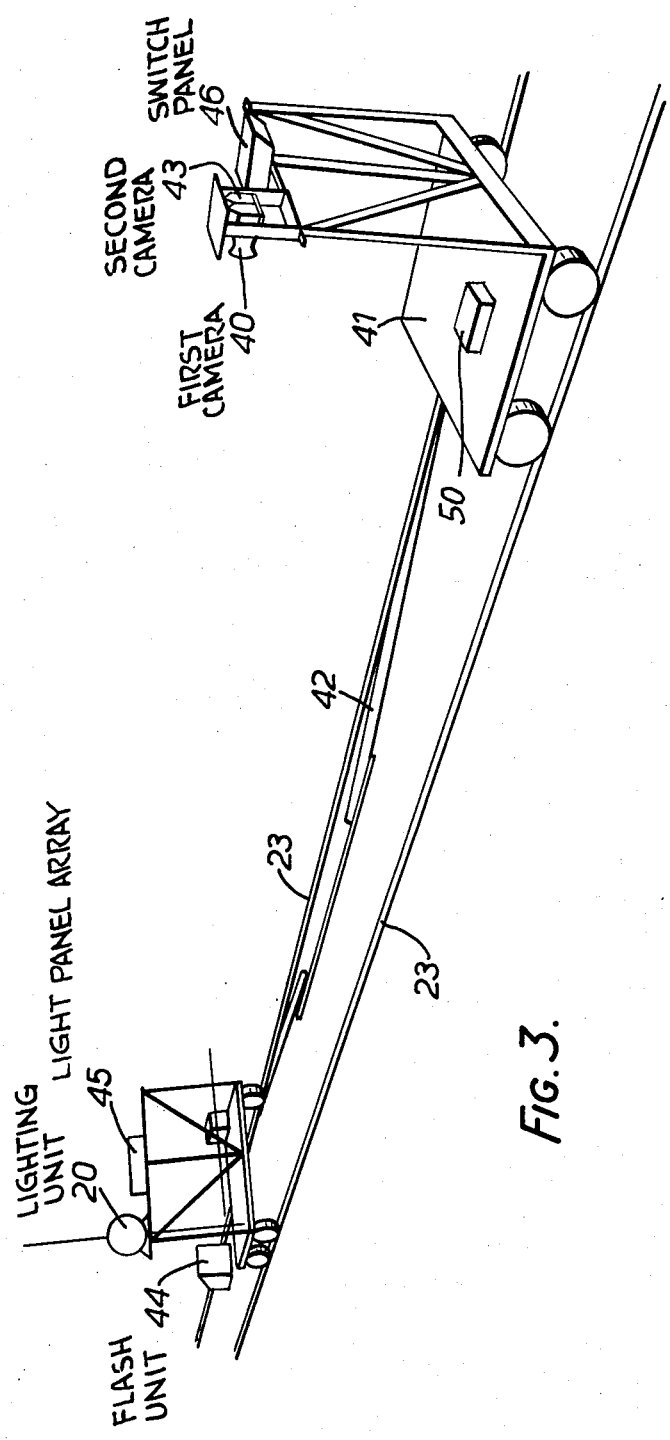
FIG. 3 is a perspective view of the complete apparatus.
Figure 4:
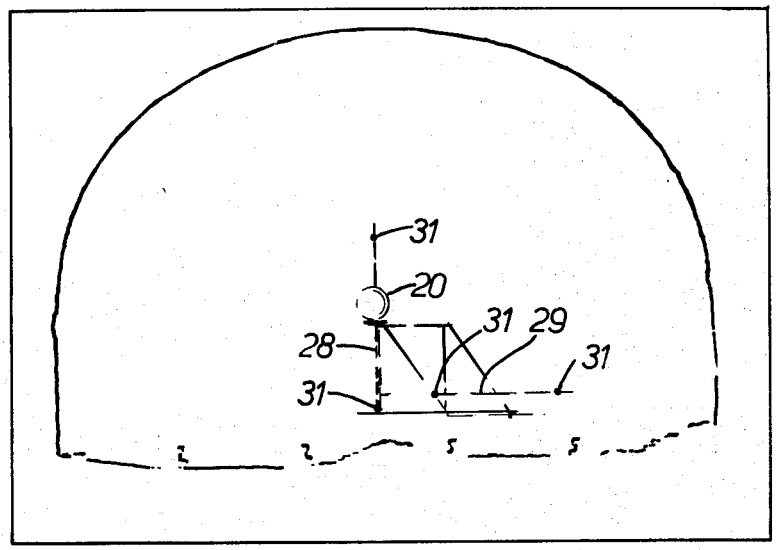
FIG. 4 depicts a photographic negative image of a tunnel profile obtained using the method of the invention.

In use, the plane of light emitted from the emitter 20 impinges on the tunnel walls and creates a line extending around the tunnel profile. This line can be recorded photographically for which purpose a first camera 40 as shown in FIG. 3 is mounted on a second trolley 41 coupled by a bar 42 at a known distance behind the first trolley carrying the lighting unit 20. A typical photographic negative obtained in this way is depicted in FIG. 4 of the drawings. As may be seen, a line image extending around the tunnel roof, walls and floor is produced and from this image any deformation can be readily detected. The scale points 30 of the scale bars appear as points of light 31.

The illumination unit and camera are advanced in steps along the tunnel and sections are recorded at the desired intervals.

In order that the causes of distortions may be easily checked conventional color photography may be employed at the same time to make a true record of the tunnel interior. For this purpose a separate second camera 43 is preferably used and the tunnel illuminated by one or more conventional flash units 44 mounted at the side of the light plane emitter 20 remote from the camera and directed away from the camera. If the flash units and the ring flash of the emitter 20 are triggered in unison it is possible to obtain a photograph of the tunnel with a bright line profile in the darkened foreground of the resultant photographic print.

Monochromatic photography is preferred for recording the illuminated section line since it permits better contrast and higher resolution. The photographic results may be analyzed by visual inspection of photographic prints produced from the negatives, or alternatively the negatives can be analyzed by an online scanning system 50 such as that sold under the name FAS-TRAK. With this system the tunnel contour image is scanned and digitized, the coordinates being corrected automatically according to the information derived from the scale points 31. This system 50 is schematically depicted in FIG. 3.

Figure 5A:
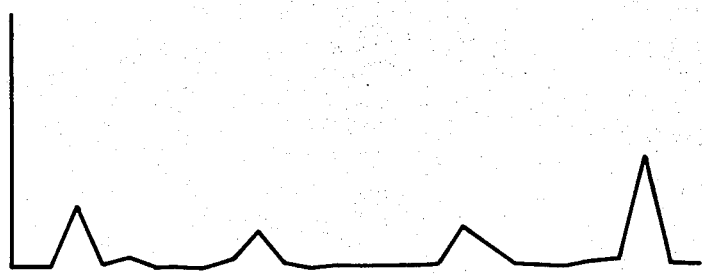
FIGS. 5a, 5b, 6a and 6b are graphs obtained by plotting Radii and Versine differences for tunnels with and without distortions.
Figure 5B:
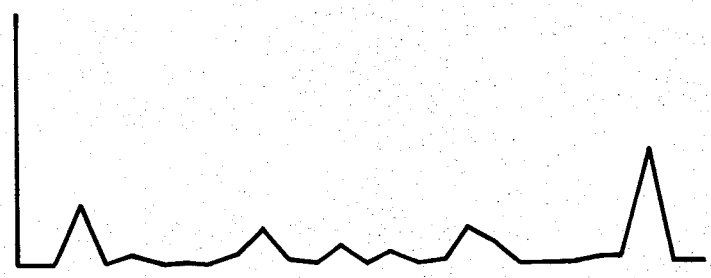
Figure 6A:
Figure 6B:
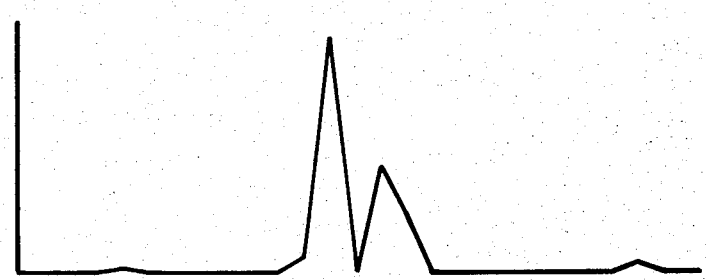

The main steps involved in the numerical analysis are summarized in Table I. Two principal methods of analysis are available to obtain parameters representative of tunnel geometry, i.e. the Radii method and the Versine method. According to the former the difference in radii between successive points is calculated, whereas according to the latter the difference in Versine between successive points is measured, the Versine being defined as the perpendicular from one point to the chord connecting the two points either the of said one point. The Radii and Versine differences are raised to the power of 4 to produce "exaggerated differences" to filter out small discrepancies within the accuracy of the system. FIGS. 5a and 6a show the characteristic graphs of the exaggerated Radii and Versine differences for a tunnel section with no distortion and FIGS. 5b and 6b are the corresponding graphs for a tunnel with 50mm distortion at the apex.

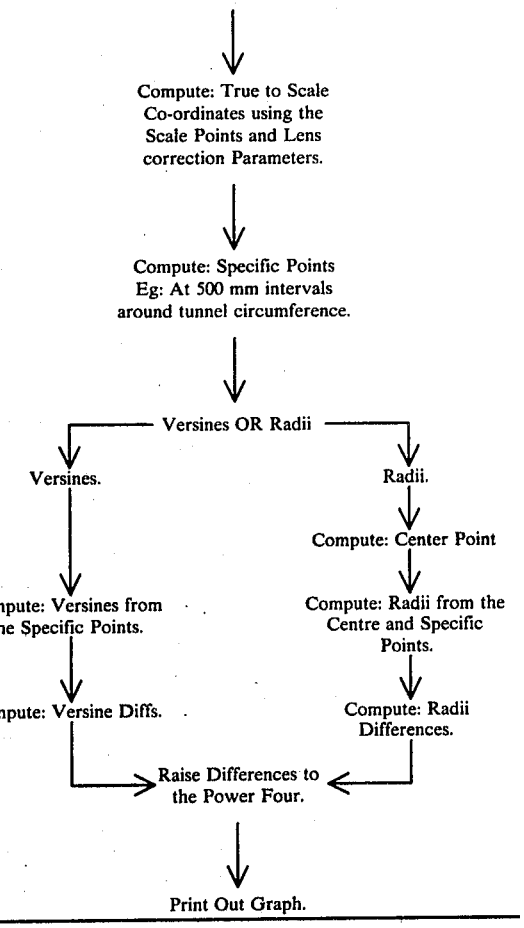

TABLE I

Without departing from the scope of the invention it will be understood that modification may be made to the apparatus and method described above. For example, the location of each section can be recorded by numerals incorporated into the photographs of tunnel sections, and which permit a computer to process this information at the digitization stage in accordance with the above noted FASTRAK system. A panel 45 containing an array of lights and a switch panel 46 allows for each light to be on or off and gives the location of the tunnel section by the position of the on lights. Each light has a unique coordinate with respect to the scale bars in the photographs.

Although conventional photography is used to provide the photographic record, any other suitable visual imaging system, such as charge-coupled devices (CCD) may be used. The system may also be used with the light generator 20 either stationary or moving and more than one light generator 20 may be used and spaced apart along the tunnel to reduce the number of photographs required for a full tunnel survey.

Advantages of the present invention include: the light plane generated is of sufficient intensity and resolution to facilitate photographic recording; the scanning and on-line data processing capability allows data to be rapidly processed and analyzed; profiles of the tunnel section are presented graphically with areas of distortion readily visible; the entire system is automatically controllable to ensure consistent results and avoids errors due to operator inexperience; and the equipment is comparatively simple and inexpensive.

A further and important advantage is the rapidity with which a full tunnel survey can be completed since there are no complicated set up procedures involved.

The light plane emitter has been described as including both halogen lamp and ring flash light sources. The ring flash produces a greater intensity of light, but only for a very short duration, and is preferred when recording illuminated sections. The halogen bulbs can produce a continuous emission of light which is good for initial adjustment of the equipment and for surveying tunnels by visual inspection. The exposure time required with the halogen lamps is too great for photography since it introduces the problem of errors, e.g. due to disturbance of the trolleys carrying the camera and light generator. With the flash the photographs are taken very quickly so the system is insensitive to such disturbances.

It will be appreciated that it is not essential to have both ring flash and halogen lamps. In some cases only one source will be needed. Furthermore, with small tunnels, e.g. sewer pipes, halogen bulbs, or even incandescent lamps may provide a light plane of sufficient intensity for photography.

The exact construction of the light plane emitter is not crucial. The main criterion for obtaining a light plane of sufficient resolution has been found to be at least two radially separated aperture slots, although they could for example be constituted by a continuous narrow passage between a pair of parallel plates as indicated by broken lines in FIG. 1. It is not essential for the light source to be located within the inner chamber and instead a device may be provided to project a beam of light into the chamber and then reflect it outwardly through the slots.

The slots preferably extend around the entire periphery of the light plane generator, but in some cases, e.g. when surveying canal tunnels, the downwardly emitted portion of the light plane may be unnecessary and therefore not provided for.

If required for use e.g. in mines where there may be an explosive atmosphere, the light plane generator can readily be modified to be a completely sealed and therefore safe unit.

It has been found empirically that to obtain an illuminated line profile of adequate resolution and intensity for photographic recordal, the diameter of the inner aperture 8 should be less than approximately half the diameter of the outer aperture 9. Furthermore, the ratio of the diameter of the outer aperture to the diameter of the tunnel being surveyed should not be less than about 1:20.

Obviously, numerous modifications and variations of the present invention are possible in light of the above teachings. It is therefore to be understood that within the scope of the appended claims, the invention may be practiced otherwise than as specifically described herein.

What is claimed is:

1. A method for surveying a structure using a device having a housing defining a chamber having a wall, a first circumferentially extending light transmitting aperture having a predetermined width formed in said wall, a second circumferentially extending light transmitting aperture having a width substantially equal to said predetermined width and spaced outwardly from and coplanar with said first aperture, and a light source, wherein said method comprises:
    selectively emitting light into said chamber with said light source;
    transmitting said light through said first and second apertures;
    forming, without lenses, a substantially planar beam of light with said first and second apertures;
    directing said planar beam light onto said structure;
    producing with said planar beam of light an illuminated profile of said structure and optically recording said illuminated profile of said structure to provide a recorded image of said illuminated profile.

2. The method of claim 1, which further comprises analyzing numerically a recorded photographic image of said illuminated profile of said structure.

3. The method of claim 2, wherein said numerical analysis comprises:
    scanning said profile on said recorded photographic image;
    digitizing coordinates of selected points on said recorded photographic image to form digitized coordinates;
    applying scale corrections to said digitized coordinates; and
    computing geometric parameters representative of said structure.

4. An apparatus for surveying structures, comprising:
    means for emitting a plane of light to produce an illuminated line profile of a structure being surveyed;
    said means having a housing enclosing a chamber;
    said chamber having a wall;
    a first light transmitting aperture having a predetermined width and extending circumferentially in said wall;
    a second light transmitting aperture having a width substantially equal to said predetermined width and extending circumferentially and spaced outwardly from and coplanar with said first aperture;
    a light source arranged to selectively illuminate said chamber such that light emitted from said chamber is transmitted through said apertures and projects therefrom as a substantially planar beam of light without using any lenses for shaping said beam of light emitted through said apertures, and means for optically recording said illuminated line profile.

5. An apparatus according to claim 4, wherein an interior surface of said housing comprises non-reflective surface.

6. An apparatus according to claim 5, wherein said first and second apertures extend substantially entirely around said chamber.

7. An apparatus according to claim 6, wherein said light source is mounted within said chamber.

8. An apparatus according to claim 7, wherein said light source comprises a photographic ring flash.

9. An apparatus according to claim 7, wherein said light source comprises a halogen lamp.

10. An apparatus according to claim 7, wherein said light source comprises a photographic ring flash and a halogen lamp.

11. An apparatus according to claim 4, further comprising a pair of opposed lip members disposed adjacent each of said first and second apertures and disposed parallel to a plane including each of said apertures.

12. An apparatus according to claim 4, wherein said means for emitting a plane of light is supported by a frame carrying orthogonal scale means for calculating a true scale of a recorded photographic image of said structure.

* * * * *